(12) United States Patent
Hughes, Jr. et al.

(10) Patent No.: US 6,419,201 B1
(45) Date of Patent: Jul. 16, 2002

(54) SELF-SUPPORTING POST LEVELING DEVICE

(76) Inventors: John M. Hughes, Jr.; Ronna A. Holloman-Hughes, both of 7220 Manchester Ave., Kansas City, MO (US) 64133

( * ) Notice: Subject to any disclaimer, the term of this patent is extended or adjusted under 35 U.S.C. 154(b) by 0 days.

(21) Appl. No.: 09/939,251

(22) Filed: Aug. 24, 2001

(51) Int. Cl.⁷ ............................................. F16M 13/00
(52) U.S. Cl. ..................................... 248/514; 248/523
(58) Field of Search ............................. 248/544, 519, 248/523, 146, 158, 168, 170, 176.1, 525, 514; 33/373

(56) References Cited

U.S. PATENT DOCUMENTS

| | | | |
|---|---|---|---|
| 2,915,273 A | | 12/1959 | Gavrun, Sr. |
| 3,832,782 A | | 9/1974 | Johnson et al. |
| 4,319,405 A | | 3/1982 | Price |
| 4,671,383 A | * | 6/1987 | Huang ........................ 182/204 |
| 4,976,040 A | | 12/1990 | Mish et al. |
| 5,002,252 A | * | 3/1991 | Setala et al. ............. 248/523 X |
| 5,207,004 A | | 5/1993 | Gruetzmacher |
| 5,253,425 A | * | 10/1993 | Wozniak ........................ 33/373 |
| 5,256,006 A | | 10/1993 | Harding |
| 5,309,645 A | | 5/1994 | Hoffmeyer |
| 5,421,094 A | | 6/1995 | McCord et al. |
| 5,815,937 A | | 10/1998 | Glorioso, Jr. |
| 5,839,200 A | | 11/1998 | Decesare |
| 6,029,359 A | * | 2/2000 | Szumer ........................ 33/373 |
| 6,050,034 A | | 4/2000 | Krinner |
| 6,102,357 A | * | 8/2000 | Papadatos .................... 248/519 |
| 6,155,529 A | * | 12/2000 | De Carlo ..................... 248/523 |

* cited by examiner

Primary Examiner—Ramon O. Ramirez
(74) Attorney, Agent, or Firm—Hovey Williams LLP

(57) ABSTRACT

A self-supporting post leveling device (10) operable to both level and support a post (12) or other structural or support member, such as, for example, a pole or beam, during erection or installation. The device (10) broadly comprises an adjustable sleeve (14), including two post adjustment mechanisms (16,18); two leveling mechanisms (20,22); and two, three, four or more legs (24,26,28,30). The post (12) is received within and substantially surrounded by the sleeve (14). The post adjustment mechanisms (16,18) tighten to immobilize the post (12) within the sleeve (14). The leveling mechanisms (20,22), such as, for example, fluid bubble leveling mechanisms or laser leveling mechanisms, may be secured to or incorporated within the sleeve (14). The legs (24,26,28,30) support the sleeve (14) and the post (12) immobilized therewithin.

18 Claims, 2 Drawing Sheets

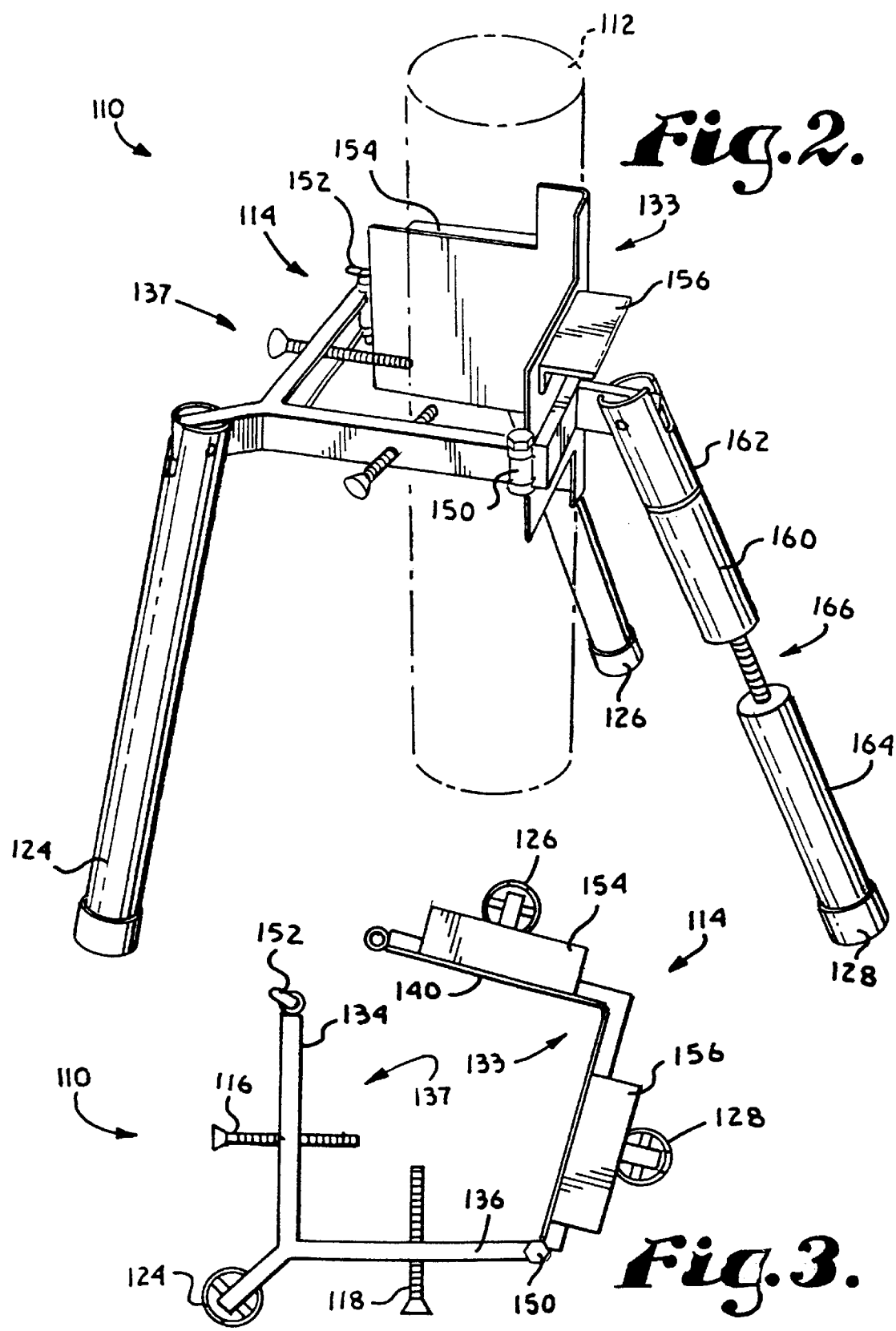

SELF-SUPPORTING POST LEVELING DEVICE

BACKGROUND OF THE INVENTION

1. Field of the Invention

The present invention relates to devices for leveling and supporting a structural or supportive member during installation thereof. More particularly, the invention relates to a self-supporting post leveling device having two, three, four or more legs and operable to support and facilitate leveling a post or other structural or supportive member, such as, for example, a pole or a beam, during installation.

2. Description of the Prior Art

It is often desirable or necessary during construction, whether commercial or residential in nature, to level a post or other structural or supportive member, such as, for example, a pole or beam. Such leveling may be desirable for aesthetic reasons, as when installing a supporting post of a fence, or necessary for structural or safety reasons, as when installing a supporting column of a covered porch or deck.

Typically, the post is installed in a two step process, including first positioning and leveling the post and then supporting the post until it is able to support itself. Commonly, a worker supports by hand both the post and a leveling device placed thereupon. By holding the leveling device in close association with the post, such that the two are parallel with a common longitudinal axis, the worker is able to adjust the post's orientation until the leveling device indicates level. Leveling devices are know in the art that secure to the post, typically being placed upon or about the post and secured thereto with a releasable strap or band, thereby freeing the worker from supporting the leveling device separate from the post.

Once leveled, the post must be secured, either temporarily or permanently. It is often desirable to temporarily support the post, such as, for example, when the post's final position is uncertain and may depend upon other subsequently positioned posts or structural members. It is also often desirable to temporarily support the post while dirt or concrete, in which the post has been placed, hardens or cures. Unfortunately, the above-mentioned existing leveling devices that secure to the post are, in fact, supported by and do not support the post.

A well-known method of achieving such temporary support is to nail to the post at least two pieces of scrap lumber oriented perpendicular to one another such that the scrap lumber projects angularly from the post to rest upon the ground and thereby provides a makeshift brace. Unfortunately, a second worker is often required to perform this operation, with the first worker supporting the post and the leveling device and maintaining level, and the second worker nailing and positioning the scrap lumber. Furthermore, nailing potentially mars the finish of or otherwise damages the post. Additionally, where the scrap lumber must rest on a hard surface, such as concrete or asphalt adjacent the post hole, the scrap lumber may be prone to slippage, thereby shifting the post out of level. It will be appreciated that if such shifting goes undetected while concrete or other supportive material cures or sets around the post, substantial labor and expense may be required to remove the concrete, re-level the post, and pour more concrete.

Due to the above-identified problems and disadvantages in the art, there is a need for an improved post leveling device.

SUMMARY OF THE INVENTION

The present invention solves the above-described and other problems and disadvantages in the prior art to provide a self-supporting post leveling device operable to support and facilitate leveling a post or other structural or supportive member, such as, for example, a pole or beam, during installation thereof. The present invention is operable to accommodate a variety of post sizes and shapes, such as round or multi-sided, thick or thin, and a variety of post materials, such as wood, plastic, or metal. The preferred post leveling device broadly comprises an adjustable sleeve, including two post adjustment mechanisms; two leveling mechanisms; and two, three, four or more legs, with one or more of the legs being length-adjustable.

The sleeve adjusts to substantially surround and immobilize the post, whether square or round, by way of the post adjustment mechanisms, which may be, for example, threaded rods or bolts perpendicularly screwed through the sleeve and operable when tightened to trap and when loosened to release the post within the sleeve. In one embodiment, the sleeve merely provides one or more shelves upon which a conventional leveling tool may be placed. In another embodiment, however, two leveling mechanisms are secured to or incorporated into the sleeve oriented perpendicular to one another. Such leveling mechanisms may be, for example, conventional fluid bubble leveling mechanisms or laser leveling mechanisms.

The legs are hingedly or pivotably coupled with the sleeve and independently positionable relative thereto. There are preferably two, three, or four legs to provide optimum stability, depending on the particular application, with at least one of the legs being provided with a length-adjustment mechanism advantageously operable to incrementally shorten or lengthen the leg. Thus, when leveling the post, positioning or length of the legs may be adjusted in order to orient, as required, the post immobilized within the sleeve.

It will be appreciated that the legs provide a number of advantages over the prior art, including providing support during positioning, leveling, and curing/setting processes. The legs allow the post to be placed upright in a tentative position while a final position is confirmed or other preliminary work is performed. Furthermore, with the legs supporting the sleeve and the post trapped therewithin, a single worker is able to perform the leveling process. Additionally, the legs can provide support during curing or setting or hardening processes when the post must be reliably braced to retain its level orientation.

These and other important features of the present invention are more fully described in the section titled DETAILED DESCRIPTION OF A PREFERRED EMBODIMENT, below.

BRIEF DESCRIPTION OF THE DRAWINGS

A preferred embodiment of the present invention is described in detail below with reference to the attached drawing figures, wherein:

FIG. 2 is an isometric view of a preferred second embodiment of the post leveling device, shown with a round post; and FIG. 3 is a top plan view of the embodiment shown in FIG. 2, wherein a sleeve portion of the post leveling device is opened about a hinge.

DETAILED DESCRIPTION OF A PREFERRED EMBODIMENT

Figure 1:
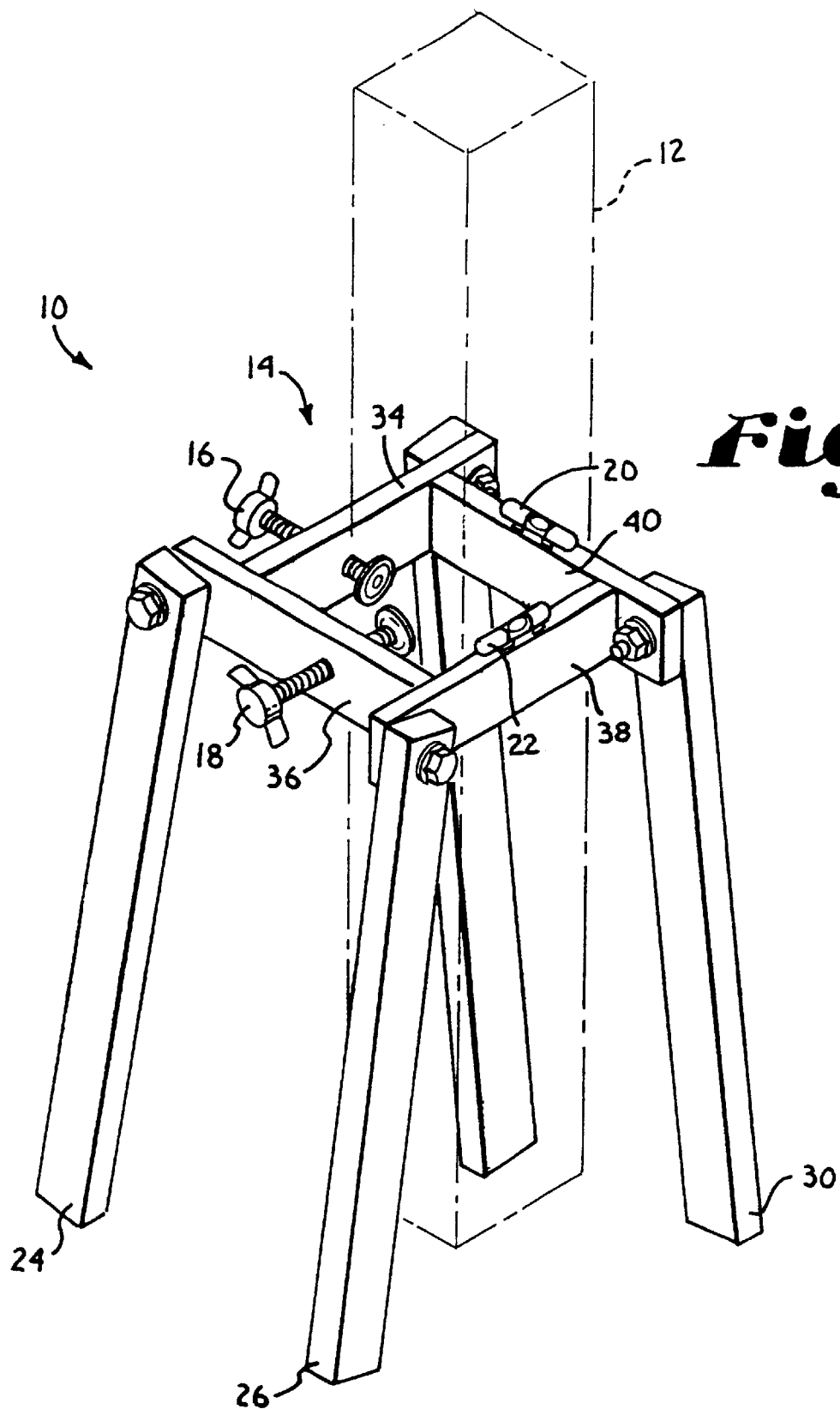
FIG. 1 is an isometric view of a preferred first embodiment of the post leveling device, shown with a square post.

Referring to FIG. 1, a post leveling device 10 is shown constructed in accordance with a preferred first embodiment of the present invention and operable to support and facilitate leveling a post 12 or other structural or support member, such as, for example, a pole or beam, during installation. The present invention is operable to accommodate a variety of post sizes and shapes, such as round or multi-sided, thick or thin; and post materials, such as wood, plastic, or metal. The preferred post leveling device 10 broadly comprises a sleeve 14, including two post adjustment mechanisms 16,18; two leveling mechanisms 20,22; and four legs 24,26,28,30.

The sleeve 14 is operable to receive and substantially surround and immobilize the post 12, and may be constructed from any suitable material, such as, for example, metal, plastic, or fiberglass. As illustrated, the sleeve includes four walls 34,36,38,40 and the two post adjustment mechanisms 16,18. The walls 34,36,38,40 are illustrated arranged in a substantially closed square configuration. Alternatively, as a matter of design, the sleeve 14 may be cylindrical or triangular in shape or may include any number of walls; thus, the present invention is independent of the geometric shape or configuration of the sleeve 14. Preferably, the two walls 38,40 opposite the post adjustment mechanisms 16,18 are at least approximately one to six or more inches in height. The post 12 is forced against the walls 38,40 and immobilized by the post adjustment mechanisms 16,18.

A longitudinal axis extends through and perpendicular to the plane of the sleeve 14. When the post 12 is received within the sleeve 14 and immobilized against the walls 38,40, the post 12 is held parallel to the longitudinal axis, thereby giving the post 12 the same orientation as the sleeve 14 and facilitating the leveling process. The two walls 38,40 help to ensure this common orientation. If the two walls 38,40 are not of sufficient height, the post 12, particularly if tall or heavy, may not be forced into a sufficiently parallel orientation with the sleeve's longitudinal axis, in which case a level sleeve 14 will not correspond to a level post 12.

The post adjustment mechanisms 16,18 are independently adjustable and operable when tightened or actuated to immobilize the post 12 against the respective opposing walls 38,40, thereby allowing the post leveling device 10 to accommodate posts of various sizes and shapes. As illustrated, each post adjustment mechanism 16,18 is a threaded rod or bolt screwed perpendicularly through a respective one of the walls 34,36. The post adjustment mechanisms 16,18 present post-contacting ends which may be rubber coated or covered or otherwise adapted to avoid marring the finish of or otherwise damaging the post 12.

The leveling mechanisms 20,22 are operable to level the sleeve 14 and thee post 12 immobilized therewithin along the longitudinal axis. As the post 12 is movable in two dimensions, two leveling mechanisms 20,22 are preferred, each being secured to a top or side or incorporated within one of the walls 38,40 of the sleeve 14 perpendicular to the longitudinal axis and to each other. Alternatively, as shown and described in an alternative embodiment below and shown in FIGS. 2 and 3, shelves 154,156 may project from the walls 138,140 to accommodate independent and removable leveling mechanisms. The leveling mechanisms 16,18 may be any suitable conventional leveling mechanism, including conventional fluid bubble leveling mechanisms or laser leveling mechanisms.

The legs 24,26,28,30 are operable to adjustably support the sleeve 14 and the post 12 immobilized therewithin. As illustrated, there are four, independently positionable legs 24,26,28,30, each hingedly or pivotably coupled with a respective one of the walls 34,36,38,40. The exact mechanism by which the legs 24,26,28,30 are coupled to the sleeve 14 is unimportant so long as the legs 24,26,28,30 remain independently positionable. Alternatively, three legs may be used, as described in the alternative embodiment below, or five or more legs may be used; however, two, three, or four legs provide optimum stability for most applications. Alternatively, only two legs 24,30 may be needed where a horizontally elongated planar structure or object, such as a section of fence, is to be leveled. It will be appreciated, that such an object or structure contributes substantially to its own stability.

Any one or more of the legs 24,26,28,30 may be adjustable with regard to length in order to, for example, further accommodate sloped surfaces upon which the post leveling device 10 might be used. That is, the length-adjustable leg may be set directly uphill and shortened or downhill and lengthened to further facilitate the leveling process.

In operation, a worker desiring to level or support the post 12 places the post 12 within the sleeve 14 such the post 12 is substantially surrounded by the four walls 34,36,38,40. As necessary, the post adjustment mechanisms 16,18 may be loosened to receive the post 12 and tightened to trap and immobilize the post 12 against the respective opposing walls 38,40. Thereafter, the worker may adjust the positioning or, as appropriate, the length of the legs 24,26,28,30 until the leveling mechanisms 20,22 indicate that the post 12 is level. As desired, the worker may then leave the post 12 supported by the device 10 until some subsequent action is called for. For example, the leveled post 12 may remain supported by the device 10 until a quantity of concrete, within which the base of the post 12 has been set, cures sufficiently to support the post 12. The device 10 may be removed from the post 12 by loosening the post adjustment mechanisms 16,18 and lifting the sleeve 14 off of the post 12.

Referring also to FIGS. 2 and 3, a preferred second embodiment of the self-supporting post leveling device 110 is shown substantially similar in form and function to the preferred first embodiment described above. In the preferred second embodiment, however, the sleeve 114 is divided into two distinct wall pairs 133,137, wherein the wall pairs 133,137 are joined at a first end by a hinge 150 and at a second end by a removable pin 152. Thus, rather than sliding the post 112 into the sleeve 114, as was required in the preferred first embodiment, the sleeve 114 may be opened about the hinge 150, placed around the post 112, and then closed and secured with the pin 152. This is particularly advantageous where the post 112 is long or heavy.

The preferred second embodiment is shown having three legs 124,126,128 rather than four. As mentioned the number of legs is a matter of design choice and may depend on the nature and physical characteristics of the posts with which the device 110 is to be used. For example, three legs may provide less stability than four legs, particularly in high winds, but are lighter, making the device 110 easier to move and position.

The preferred second embodiment illustrates a length-adjustment mechanism 160 advantageously operable to incrementally shorten or lengthen the leg 128 with which the mechanism 160 is associated. The mechanism 1.60 is interposed between upper and lower portions 162,164 of the leg 128, being freely rotatably coupled with the upper portion 162 by any conventional means and threadably coupled with the lower portion 164 by a threaded rod 166. Rotating the mechanism 160 in a first direction causes the threaded rod 166 to draw the upper and lower portions 162,164 together, thereby shortening the leg 128; rotating the mechanism 160 in a second direction causes the threaded rod 166 to force the upper and lower portions 162,164 apart, thereby lengthening the leg 128. Because the mechanism 160 is freely rotatably coupled with the upper portion 162 and threadably coupled with the lower portion 164, rotation of the mechanism 160 does not result in rotation or other undesirable movement of either the upper or the lower portion 162,164. This latter feature is particularly advantageous as rotation of the lower portion 164 could cause the leg 128 to travel about the surface upon which it rests, thereby undesirably reorienting the device 10 and post 12.

As mentioned, the preferred second embodiment is also shown providing shelves 154,156 projecting perpendicularly from atop two of the walls 138,140 and upon which the leveling mechanisms may be placed or secured.

In operation, a worker desiring to level or support the post 112 removes the pin 152, opens the sleeve 114 about the hinge 150, and places the sleeve 114 about the post 112 such the post 12 is substantially surrounded by the four walls 134,136,138,140, whereafter the sleeve 114 is closed and the pin 152 replaced. As necessary, the post adjustment mechanisms 116,118 may be loosened to allow the sleeve 114 to be closed, and may be tightened to trap and immobilize the post 112 against the respective opposing walls 138,140. Thereafter, the worker may adjust the positioning or, as appropriate, the length of the legs 124,126,128 until the leveling mechanisms indicate that the post 112 is level. The post 112 may be freed from the device 10 by removing the pin 152, opening the sleeve 114, and removing the post 112, whereafter the sleeve 114 may be closed and the pin 152 replaced to facilitate transportation or storage of the device 110.

From the preceding description, it will be appreciated that the self-supporting post leveling device of the present invention is advantageously operable to both support and facilitate leveling a post or other structural or support member, such as, for example, a pole or beam, during installation.

Although the invention has been described with reference to the two preferred embodiments illustrated in the attached drawings, it is noted that equivalents may be employed and substitutions made herein without departing from the scope of the invention as recited in the claims. For example, as mentioned, the sleeve may affect any suitable shape, such as, circular, square, or hexagonal, and include any number of walls. Furthermore, two, three, four, or more, legs may be used, any number of which may be adjustable with regard to length.

Having thus described the preferred embodiment of the invention, what is claimed as new and desired to be protected by Letters Patent includes the following:

1. A self-supporting post leveling device for leveling and supporting a post, the post leveling device comprising:
   a sleeve operable to receive the post, wherein the sleeve is operable to be opened and closed about a hinge; and
   at least two legs operable to support the sleeve and the post, with each leg being movably coupled with the sleeve and independently positionable relative thereto.

2. The self-supporting post leveling device as set forth in claim 1, further including a post adjustment mechanism coupled with the sleeve and adjustable to immobilize the post received within the sleeve.

3. The self-supporting post leveling device as set forth in claim 2, wherein the post adjustment mechanism is a threaded rod screwed perpendicularly through the sleeve so as to be tightenable against the post received within the sleeve.

4. The self-supporting post leveling device as set forth in claim 1, wherein at least one of the legs includes an adjustment mechanism operable to lengthen and shorten the leg.

5. The self-supporting post leveling device as set forth in claim 4, wherein the adjustment mechanism is rotatably interposed between an upper portion and a lower portion of the leg such that rotation of the adjustment mechanism in a first direction causes the leg to lengthen and rotation of the adjustment mechanism in a second direction causes the leg to shorten.

6. The self-supporting post leveling device as set forth in claim 1, further including a leveling mechanism associated with the sleeve and operable to indicate a level orientation of the sleeve and the post received therewithin.

7. The self-supporting post leveling device as set forth in claim 6, wherein the leveling mechanism is a fluid bubble leveling mechanism.

8. The self-supporting post leveling device as set forth in claim 6, wherein there are two of the leveling mechanisms associated with the sleeve, with each leveling mechanism being oriented perpendicular to the other and to a longitudinal axis of the sleeve, and operable to indicate a level orientation of the sleeve and the post received therewithin.

9. The self-supporting post leveling device as set forth in claim 1, wherein there are more than two legs.

10. A self-supporting post leveling device for leveling and supporting a post, the post leveling device comprising:
    a sleeve operable to receive the post, wherein the sleeve is operable to be opened and closed about a hinge;
    a post adjustment mechanism coupled with the sleeve and adjustable to immobilize the post received within the sleeve;
    at least two leveling mechanisms associated with the sleeve, with each leveling mechanism being oriented perpendicular to the other and to a longitudinal axis of the sleeve, and operable to indicate a level orientation of the sleeve and the post immobilized therewithin; and
    at least three legs operable to support the sleeve and the immobilized post, with each leg being movably coupled with the sleeve and independently positionable relative thereto.

11. The self-supporting post leveling device as set forth in claim 10, wherein at least one of the legs includes an adjustment mechanism operable to lengthen and shorten the leg.

12. The self-supporting post leveling device as set forth in claim 11, wherein the adjustment mechanism is rotatably interposed between an upper portion and a lower portion of the leg such that rotation of the adjustment mechanism in a first direction causes the leg to lengthen and rotation of the adjustment mechanism in a second direction causes the leg to shorten.

13. The self-supporting post leveling device as set forth in claim 10, wherein the post adjustment mechanism is a threaded rod screwed perpendicularly through the sleeve so as to be tightenable against the post received within the sleeve.

14. The self-supporting post leveling device as set forth in claim 10, wherein the leveling mechanism is a fluid bubble leveling mechanism.

15. The self-supporting post leveling device as set forth in claim 10, wherein there are four legs.

16. A self-supporting post leveling device for leveling and supporting a post, the post leveling device comprising:
    a sleeve operable to receive the post, wherein the sleeve is operable to be opened and closed about a hinge;

a post adjustment mechanism including a threaded rod screwed perpendicularly through the sleeve so as to be tightenable against the post received within the sleeve;

at least two leveling mechanisms associated with the sleeve, with each leveling mechanism being oriented perpendicular to the other and to a longitudinal axis of the sleeve, and operable to indicate a level orientation of the sleeve and the post received therewithin; and at least three legs operable to support the sleeve and the post, with each leg being movably coupled with the sleeve and independently positionable relative thereto, and at least one of the legs including an adjustment mechanism rotatably interposed between an upper portion and a lower portion of the leg such that rotation of the adjustment mechanism in a first direction causes the leg to lengthen and rotation of the adjustment mechanism in a second direction causes the leg to shorten.

17. The self-supporting post leveling device as set forth in claim 16, wherein the leveling mechanism is a fluid bubble leveling mechanism.

18. The self-supporting post leveling device as set forth in claim 16, wherein the leveling mechanism is a laser leveling mechanism.

* * * * *